United States Patent [19]

Emery

[11] 3,988,810

[45] Nov. 2, 1976

[54] JAMMING CLEAT FOR RELEASABLY HOLDING ROPES CORDS, CABLES AND SIMILAR ELONGATE ARTICLES

[76] Inventor: Reginald John Emery, 13 Coneydale, Welwyn Garden City, Hertfordshire, England

[22] Filed: Jan. 20, 1975

[21] Appl. No.: 542,472

[52] U.S. Cl. .............................. 24/128 R; 24/130; 403/213
[51] Int. Cl.² .................................... F16G 11/04
[58] Field of Search ............ 24/130, 128, 81 F, 264; 403/213, 211, 209

[56] References Cited
UNITED STATES PATENTS

| | | | |
|---|---|---|---|
| 1,515,418 | 11/1924 | Smith | 24/130 |
| 2,449,235 | 9/1948 | Krupp | 24/130 |
| 2,460,640 | 2/1949 | Jensen et al. | 24/130 |
| 2,592,696 | 4/1952 | Hoody | 24/128 R |
| 3,574,900 | 4/1971 | Emery | 24/130 |

*Primary Examiner*—Casmir A. Nunberg
*Assistant Examiner*—Kenneth J. Dorner
*Attorney, Agent, or Firm*—Arthur A. March

[57] ABSTRACT

The present invention relates to a jamming cleat for quickly securing the end of a rope, cable or cord. Such a cleat is disclosed in my U.S. Pat. No. 3,574,900. In that known device one end of a cord is held between the walls of a V-shaped groove and the walls are formed with ridges sloping in such a way that the greater the load on the cord the more securely is the cord held in the groove. In the present invention means are provided whereby the cord may be passed around an object and then both ends secured in the cleat. For this purpose the cleat is formed with a fairlead serving to hold the cord in a position such that one end can be engaged in the V-groove with greater certainty and also with an anchorage for the other end of the cord.

9 Claims, 7 Drawing Figures

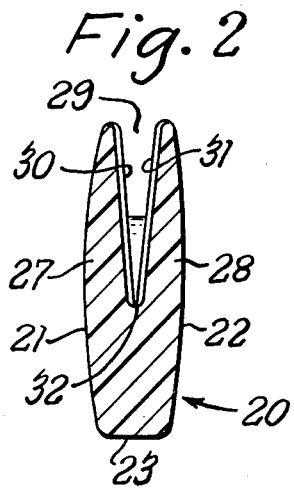
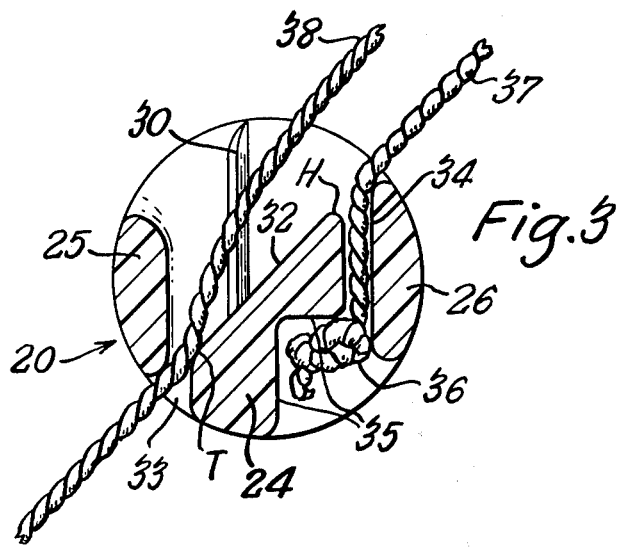
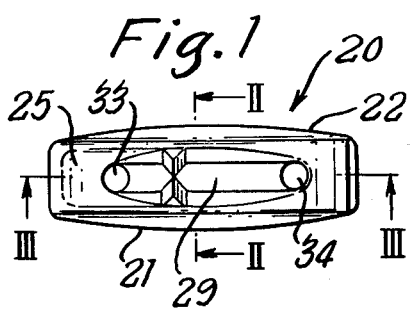
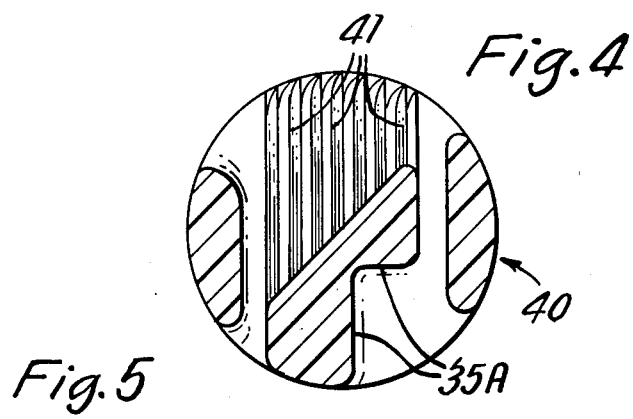
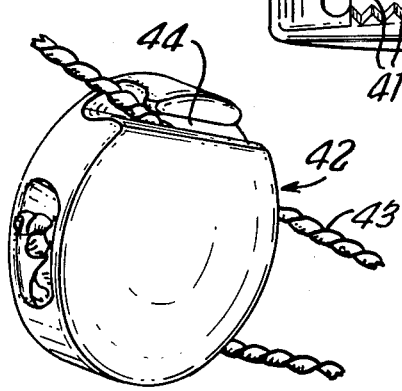
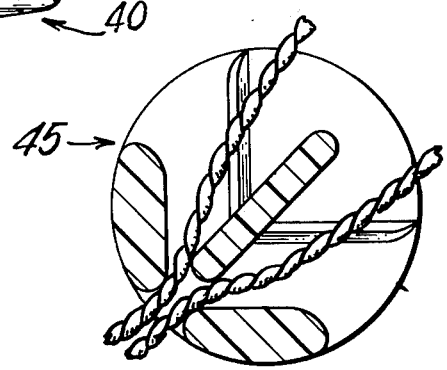

JAMMING CLEAT FOR RELEASABLY HOLDING ROPES CORDS, CABLES AND SIMILAR ELONGATE ARTICLES

BACKGROUND OF THE INVENTION

In U.S. Pat. No. 3,574,900 there is described a jamming cleat having a groove opening out of one side and extending over the whole length of the cleat, the groove having opposed internal faces which converge towards the bottom or trough of the groove and ridges on each face, the ridges on both faces being inclined to the trough of the groove upwardly from one end of the groove.

Each of the cleats described in that patent was designed to hold fast one end only of a rope, cord or cable, the other end being attached to an object separate from the cleat, such as a boat sail.

It is an object of the present invention to provide a cleat in which both ends of the cord can be held fast, thus enabling the cleat to be used in the manner of a buckle on wearing apparel, although the present cleat is not limited to use on wearing apparel. One end of the cord may be removably held in the cleat and the other end relatively permanently engaged in the cleat. Alternatively, both ends of the cord may be removably held in the cleat.

Another object of the present invention is to provide means on the cleat which serves to ensure that each removable end of the cord lies permanently in a position such that engagement of the cord can be achieved with the greatest ease and certainty and with only a small manipulation of the cord end.

Hereinafter the word "cord" will be used to denote such elongate articles as cords, cables, and ropes.

STATEMENT OF THE INVENTION

With the above stated objects in view, and in accordance with the invention, there is provided a jamming cleat for securing both ends of a cord comprising a body having a head and a tail, a pair of walls integral with the body and extending away therefrom at a V-angle of between 8° and 20° to form a groove for reception of the cord, there being formed on each wall at least one ridge which slopes away from the trough of the groove, towards the head, at an angle of between 20° and 50°, an anchorage on the body for one end of the cord and, formed on the body at a position adjacent both the tail and the groove, a fairlead through which the other end of the cord may be passed for removable engagement in the groove.

DESCRIPTION OF THE DRAWINGS

FIG. 1 is an edge view of a button-shaped cleat, looking into the groove of the cleat;

FIGS. 2 and 3 are sections on the lines II—II and III—III of FIG. 1 respectively, a cord being shown in FIG. 3;

FIG. 4 is a view similar to that of FIG. 3, but showing a cleat with several ridges on each wall;

FIG. 5 is a plan of the cleat of FIG. 4;

FIG. 6 is a perspective view of another cleat; and

FIG. 7 is a section illustrating a fourth cleat.

DESCRIPTION OF PREFERRED EMBODIMENTS

The cleat illustrated at 20 in FIGS. 1 to 3 is externally of button-shape, having two slightly convex faces 21 and 22 and a fairly thick cylindrical edge 23. The cleat 20 has a body portion 24 and two peripheral portions 25 and 26. These three portions extend through the thickness of the cleat. The body has a head H and a tail T.

Extending away from the body are two walls 27 and 28, which make a V-angle of 14° one with the other and thus form a groove 29 for the reception of a cord. The angle between the walls may be between 8° and 20°.

On the wall 27 there is formed a ridge 30 and on the wall 28 is formed a similar ridge 31. These ridges slope away from the trough 32 of the groove 29 at an angle of between 20° and 50°. As shown they are at the preferred angle of 45°; it will be seen also that they slope away from the trough and toward the head H of the body. Each ridge is preferably triangular in cross-section with an apex angle of between 40° and 100°; as shown this angle is 90°.

The body of the cleat is formed with two through-bores, or tunnels 33 and 34, the latter one opening into an enlargement or recess 35. One end 36 of the cord 37 which is to be engaged in the cleat is threaded through the tunnel 34 and then knotted, so that this end can be permanently anchored in the recess 35. It will be seen that the point of anchorage lies on the side of the body opposite the V-groove 29.

The other through-bore 33 lies under the peripheral portion 25 and this portion thus constitutes a fairlead for the cord. It is to be noted that the narrowest portion of the fairlead is at the tail T of the body and adjacent the trough 32 of the groove 29.

In use the un-knotted, or loose, end 38 of the cord is placed around the object to be fastened, for example the cord may constitute a belt in a pair of swim trunks, and the loose end is threaded through the fairlead 33, upwards as viewed in FIG. 3. It is drawn tight and simultaneously moved transversely into the groove 29 until the ridges 30 and 31 bite on to it. Owing to the slope of the ridges and the direction in which the cord lies across them, when the loose end 38 is released the cord is driven down the ridges further into the groove so that the cleat obtains a tight hold on the cord; a hold which is increased with increasing load on the cord.

The cord can be very easily disengaged from the ridges by pulling and lifting the loose end 38 of the cord, which action causes the cord to rise up the ridges of the cleat.

The cleat 40 illustrated in FIGS. 4 and 5 is similar in all respects to that of FIGS. 1 to 3 except that (a) it is formed with a plurality of similar ridges 41 on the walls of its groove and (b) the transverse width of the groove 29A diminishes from the tail to the head end until, at the head it is of width less than the thickness of the cord. In this way it is ensured that the cord emerging from the tunnel 35A cannot be engaged in the groove.

The cleat 42 shown in perspective in FIG. 6 is also similar to that of FIGS. 1 to 3 except that, to avoid the nuisance of having to thread a cord 43 through the fairlead, the latter is formed with a slot 44 through which the cord can be passed, transversely, into the fairlead.

In all of the cleats described above, one end of the cord is semi-permanently anchored to the cleat, as by knotting. However, other anchoring means may be used; for example the one end may be tied around the peripheral portion 26 of the cleat.

As illustrated in FIG. 7, both ends of the cord are removably engaged in a cleat 45. For this purpose the upper left-half of this cleat is made identical with the upper left-half of cleat 20, (with reference to FIG. 3) and the lower right-half of cleat 45 is made the mirror image of its upper left-half. Thus the median planes of the two grooves are co-planar. With this arrangement the loose ends of the cord can be tightened and loosened in the cleat simultaneously.

The ridges on the two walls are preferably opposite but may be in staggered relationship.

The cleats herein described are made of any hard rigid material such as the synthetic plastics material NYLON (Registered Trade Mark).

I claim:

1. A jamming cleat for securing both ends of a cord, comprising a body having a head and a tail, a pair of walls integral with the body and extending away therefrom at a V-angle of between 8° and 20° to form a groove for reception of the cord, which groove extends in the direction from the head to the tail and internally terminates in a longitudinal trough at the apex of the V-angle, and which trough extends from the head to the tail, there being formed on each wall at least one ridge which extends from the trough of the groove, towards the head, at an angle of between 20° and 50° with respect to the trough, an anchorage on the body for one end of the cord and, formed on the body at a position separated by the body from the anchorage and adjacent both the tail and the corresponding portion of the trough of the groove thereat and communicating with the groove, a fairlead through which the other end of the cord may be passed for removable engagement in the groove.

2. A cleat as claimed in claim 1, wherein the anchorage comprises a second pair of ridged walls similar to those of the said pair recited in claim 1, the median planes of the two pairs of walls being co-planar.

3. A cleat as claimed in claim 1, wherein the anchorage consists of a hole located in the body on the side thereof opposite from the walls and remote from the trough and of size such that one end of the cord may be passed through and then knotted to prevent its retraction.

4. A cleat as claimed in claim 1, wherein the fairlead lies substantially parallel to the ridges.

5. A cleat as claimed in claim 1, wherein the fairlead is formed with a slot, substantially parallel to the length of the fairlead, opening out of the body and through which the cord may be passed transversely into the fairlead.

6. A cleat as claimed in claim 1, of disc shape and having both circular faces slightly convex.

7. A cleat as claimed in claim 2, in combination with a cord having its ends removably anchored between the two pairs of walls respectively.

8. A cleat as claimed in claim 3, in combination with a cord having one end secured in the anchorage and the other end removably secured between a pair of walls.

9. A cleat as claimed in claim 1, wherein the average width of the groove diminishes from the tail to the head end of the body of the cleat.

* * * * *